US010841037B2

(12) United States Patent
Mallik et al.

(10) Patent No.: US 10,841,037 B2
(45) Date of Patent: Nov. 17, 2020

(54) MANAGING INTERFERENCE IN A NETWORK

(71) Applicant: QUALCOMM Incorporated, San Diego, CA (US)

(72) Inventors: Siddhartha Mallik, San Diego, CA (US); Taesang Yoo, San Diego, CA (US); Tao Luo, San Diego, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 175 days.

(21) Appl. No.: 14/150,632

(22) Filed: Jan. 8, 2014

(65) Prior Publication Data
US 2014/0204857 A1 Jul. 24, 2014

Related U.S. Application Data

(60) Provisional application No. 61/755,377, filed on Jan. 22, 2013.

(51) Int. Cl.
H04L 1/00 (2006.01)
H04L 1/20 (2006.01)
(Continued)

(52) U.S. Cl.
CPC .......... H04L 1/0003 (2013.01); H04J 11/005 (2013.01); H04J 11/0036 (2013.01);
(Continued)

(58) Field of Classification Search
USPC ........................................................ 370/329
See application file for complete search history.

(56) References Cited

U.S. PATENT DOCUMENTS 9,042,497 B2* 5/2015 Abdelmonem ....... H04L 5/0026
375/229
2003/0021243 A1* 1/2003 Hamalainen .......... H04L 1/0009
370/329
(Continued)

FOREIGN PATENT DOCUMENTS

WO 2010141912 A2 12/2010
WO 2012097433 A1 7/2012
WO 2012147616 A1 11/2012

OTHER PUBLICATIONS

Huawei et al., "Considerations on Range Expansion", 3GPP Draft; R1-125135 Considerations on Range Expansion, 3rd Generation Partnership Project (3GPP), Mobile Competence Centre; 650, Route Des Lucioles; F-06921 Sophia-Antipolis Cedex; France, vol. RAN WG1, No. New Orleans, USA; Nov. 12, 2012-Nov. 16, 2012 Nov. 3, 2012 (Nov. 3, 2012), XP050662995, Retrieved from the Internet: URL :http://www.3gpp.org/ftp/tsg_ran/WG1_RL1/TSGR1 71/Docs/ [retrieved on Nov. 3, 2012] p. 2, paragraph 2.2.
(Continued)

Primary Examiner — Gregory B Sefcheck
Assistant Examiner — Majid Esmaeilian
(74) Attorney, Agent, or Firm — Arent Fox, LLP

(57) ABSTRACT

A method, an apparatus, and a computer program product for wireless communication are provided. In one configuration, the apparatus may be a UE. The UE determines an MCS that would facilitate interference suppression of an interfering first cell transmission from a first cell when decoding a second cell transmission from a second cell at the UE. The interfering first cell transmission is a transmission unintended for the UE. The second cell transmission is a transmission intended for the UE. The UE transmits information indicating the determined MCS for the first cell. The UE receives a transmission including the second cell transmission from the second cell and the interfering first cell
(Continued)

transmission from the first cell. The UE demodulates and/or decodes the second cell transmission from the received transmission based on the determined MCS.

23 Claims, 13 Drawing Sheets

(51) Int. Cl.
| | |
|---|---|
| *H04J 11/00* | (2006.01) |
| *H04L 25/03* | (2006.01) |
| *H04W 72/12* | (2009.01) |
| *H04W 72/08* | (2009.01) |
| *H04W 24/10* | (2009.01) |
| *H04W 28/04* | (2009.01) |

(52) U.S. Cl.
CPC .......... *H04L 1/0009* (2013.01); *H04L 1/0025* (2013.01); *H04L 1/0048* (2013.01); *H04L 1/20* (2013.01); *H04L 25/0328* (2013.01); *H04L 25/03305* (2013.01); *H04W 24/10* (2013.01); *H04W 28/04* (2013.01); *H04W 72/08* (2013.01); *H04W 72/1236* (2013.01); *H04L 1/0026* (2013.01); *H04L 2001/0092* (2013.01)

(56) References Cited

U.S. PATENT DOCUMENTS

| | | | | |
|---|---|---|---|---|
| 2007/0274343 | A1* | 11/2007 | Nishio | H04W 72/082 370/479 |
| 2009/0279512 | A1* | 11/2009 | Fujishima | H04B 7/0617 370/336 |
| 2009/0286562 | A1* | 11/2009 | Gorokhov | H04B 7/0617 455/501 |
| 2010/0009705 | A1 | 1/2010 | Budianu et al. | |
| 2010/0075703 | A1* | 3/2010 | Imai | H04B 7/0417 455/501 |
| 2010/0150206 | A1* | 6/2010 | Futagi | H04W 72/1226 375/130 |
| 2010/0195749 | A1* | 8/2010 | Kimura | H04B 7/0671 375/260 |
| 2010/0309861 | A1 | 12/2010 | Gorokhov et al. | |
| 2010/0309867 | A1* | 12/2010 | Palanki | H04L 5/0053 370/329 |
| 2011/0053495 | A1* | 3/2011 | Hara | H04B 7/15542 455/7 |
| 2011/0085457 | A1* | 4/2011 | Chen et al. | 370/252 |
| 2012/0082038 | A1* | 4/2012 | Xu | H04J 11/0023 370/244 |
| 2012/0099540 | A1 | 4/2012 | Doppler et al. | |
| 2013/0242860 | A1* | 9/2013 | Kim | H04W 72/082 370/328 |
| 2013/0250885 | A1* | 9/2013 | Davydov | H04B 7/0652 370/329 |
| 2013/0265951 | A1* | 10/2013 | Ng | H04B 7/0452 370/329 |
| 2013/0272436 | A1* | 10/2013 | Makhlouf | H04L 1/0025 375/260 |
| 2013/0301599 | A1* | 11/2013 | Valentin | H04L 1/0026 370/329 |
| 2013/0315198 | A1* | 11/2013 | Krishna Kumar | H04L 1/1607 370/330 |
| 2014/0024388 | A1* | 1/2014 | Earnshaw et al. | 455/452.2 |
| 2014/0233378 | A1* | 8/2014 | Jappila | H04W 24/02 370/230 |

OTHER PUBLICATIONS

Huawei et al., "Restricted Resource Subframe for HetNet", 3GPP Draft; R1-130510 Restricted Resource Subframe for Hetnet, 3rd Generation Partnership Project (3GPP), Mobile Competence Centre ; 650, Route Des Lucioles ; F-06921 Sophia-Antipo Lis Cedex ; France vol. RAN WG1 , No. St Julian; Jan. 28, 2013-Feb. 1, 2013 Jan. 19, 2013 (Jan. 19, 2013), XP050663776, Retrieved from the Internet: URL : http://www.3gpp.org/ftp/tsg_ran/WG1_RL 1/TSGR1_72/Docs/ [retrieved on Jan. 19, 2013] p. 3, paragraph 2.2.
International Search Report and Written Opinion—PCT/US2014/010898—ISA/EPO—dated Apr. 23, 2014.
Orange, "Views on Release 12", 3GPP Draft; RWS-120005 Orange Views on REL-12, 3rd Generation Partnership Project (3GPP), Mobile Competence Centre ; 650, Route Des Lucioles ; F-06921 Sophia-Antipolis Cedex ; France , No. Ljubljana, Slovenia; Jun. 11, 2012-Jun. 12, 2012 Jun. 1, 2012 (Jun. 1, 2012), XP050655095, Retrieved from the Internet: URL :http://www.3gpp .org/ftp/workshop/2012- 06-11_12_RAN_REL12/Docs/ [retrieved on Jun. 1, 2012].

\* cited by examiner

US 10,841,037 B2

MANAGING INTERFERENCE IN A NETWORK

CROSS-REFERENCE TO RELATED APPLICATION(S)

This application claims the benefit of U.S. Provisional Application Ser. No. 61/755,377, entitled "APPARATUS AND METHOD OF MANAGING INTERFERENCE IN A NETWORK" and filed on Jan. 22, 2013, which is expressly incorporated by reference herein in its entirety.

BACKGROUND

Field

The present disclosure relates generally to communication systems, and more particularly, to managing interference in a network.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus may be a user equipment (UE). The UE determines a modulation and coding scheme (MCS) that would facilitate interference suppression of an interfering first cell transmission from a first cell when decoding a second cell transmission from a second cell at the UE. The interfering first cell transmission is a transmission unintended for the UE. The second cell transmission is a transmission intended for the UE. The UE transmits information indicating the determined MCS for the first cell. The UE receives a transmission including the second cell transmission from the second cell and the interfering first cell transmission from the first cell. The UE demodulates the second cell transmission from the received transmission based on the determined MCS. The UE may demodulate and/or decode the second cell transmission from the received transmission based on an assumption that the interfering first cell transmission is at least one of modulated or encoded based on the determined MCS.

In an aspect of the disclosure, a method, a computer program product, and an apparatus are provided. The apparatus may be a cell. The cell receives information indicating an MCS that would facilitate interference suppression by a first UE of a cell transmission from the cell. The cell performs at least one of modulating or encoding data based on the received information indicating the MCS. The cell transmits the data in the cell transmission to a second UE.

DETAILED DESCRIPTION

Figure 1:
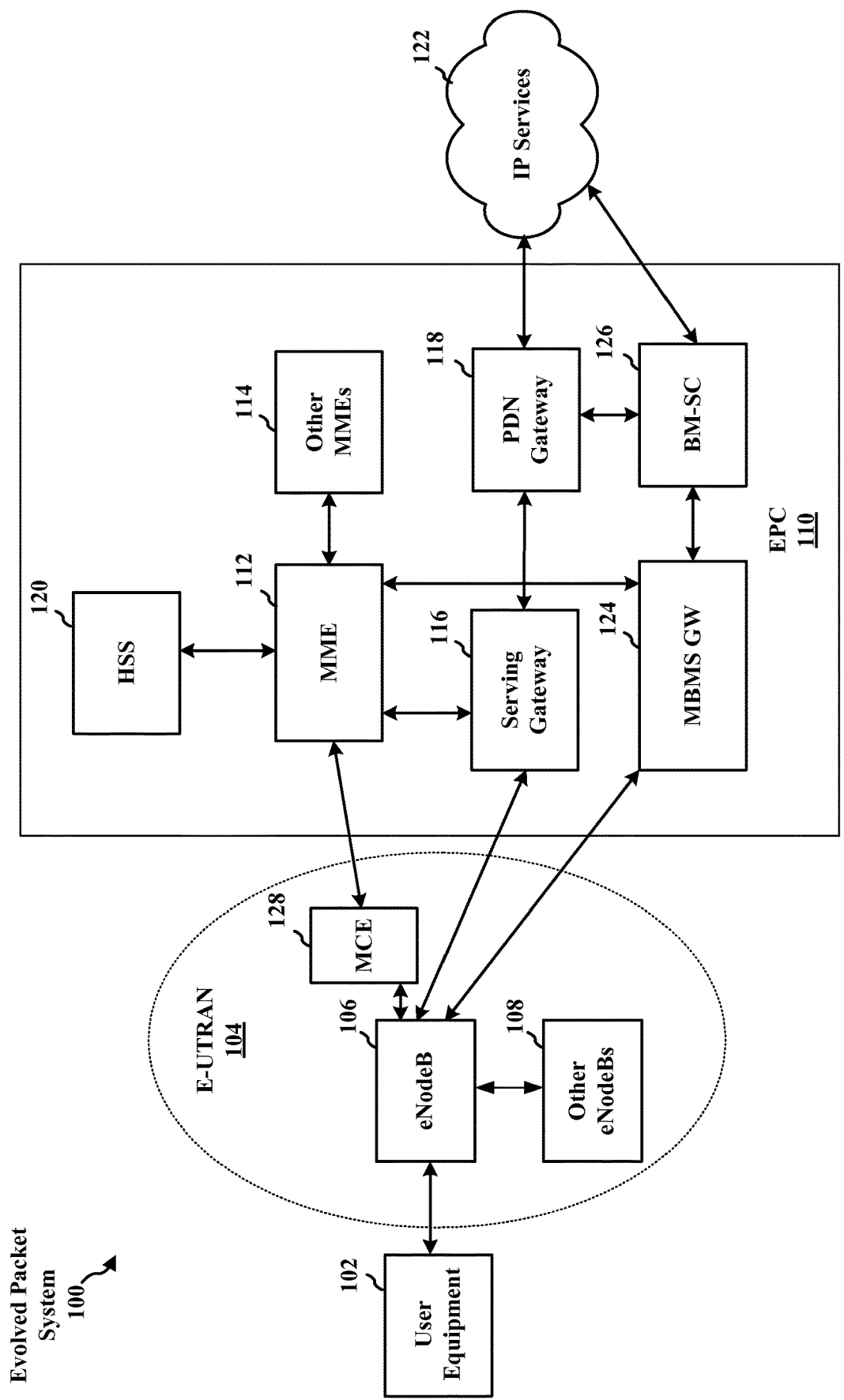
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106, other eNBs 108, and a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
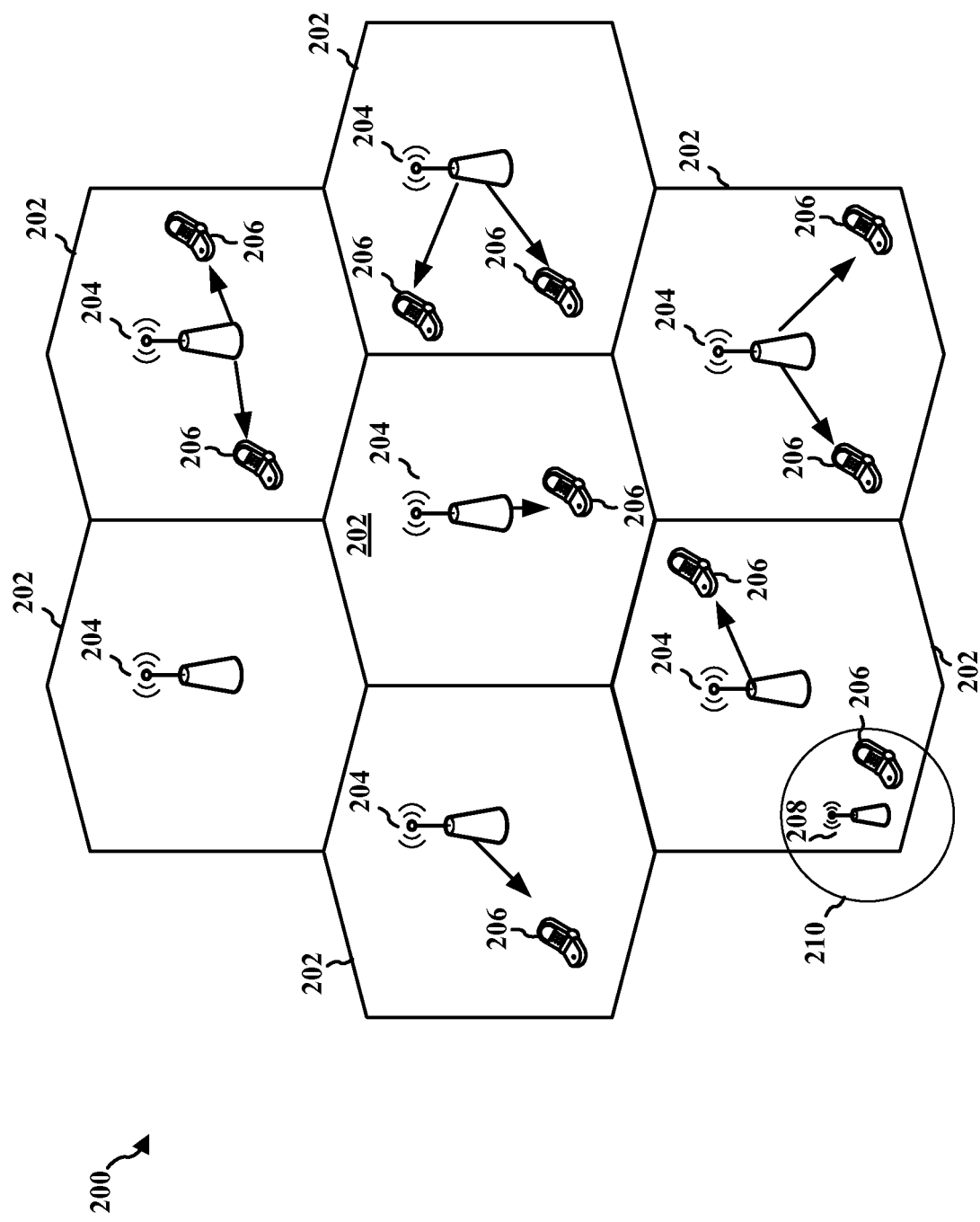
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
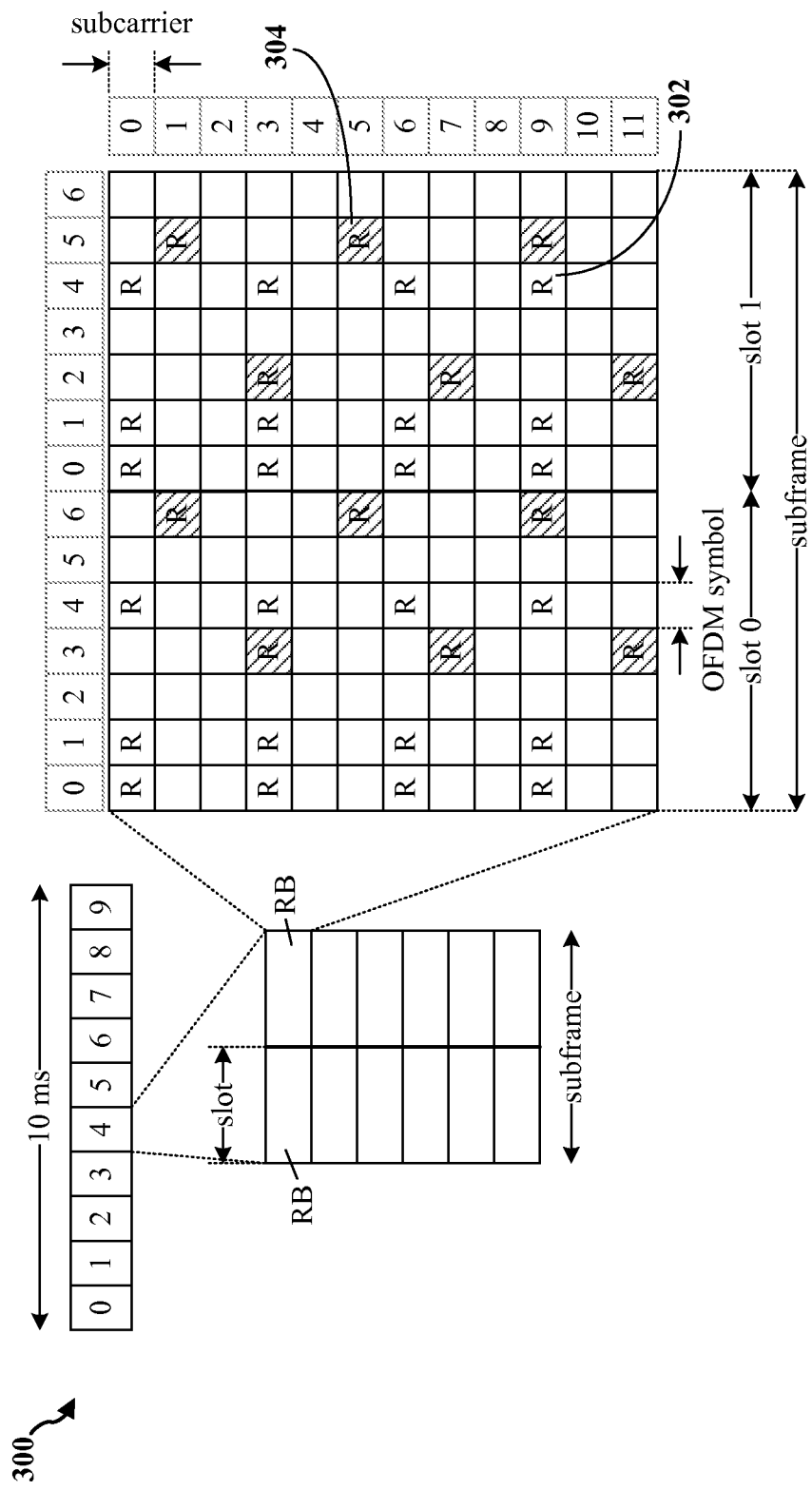
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in each OFDM symbol in the time domain, for a total of 84 resource elements. For an extended cyclic prefix, a resource block contains 6 consecutive OFDM symbols in the time domain for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
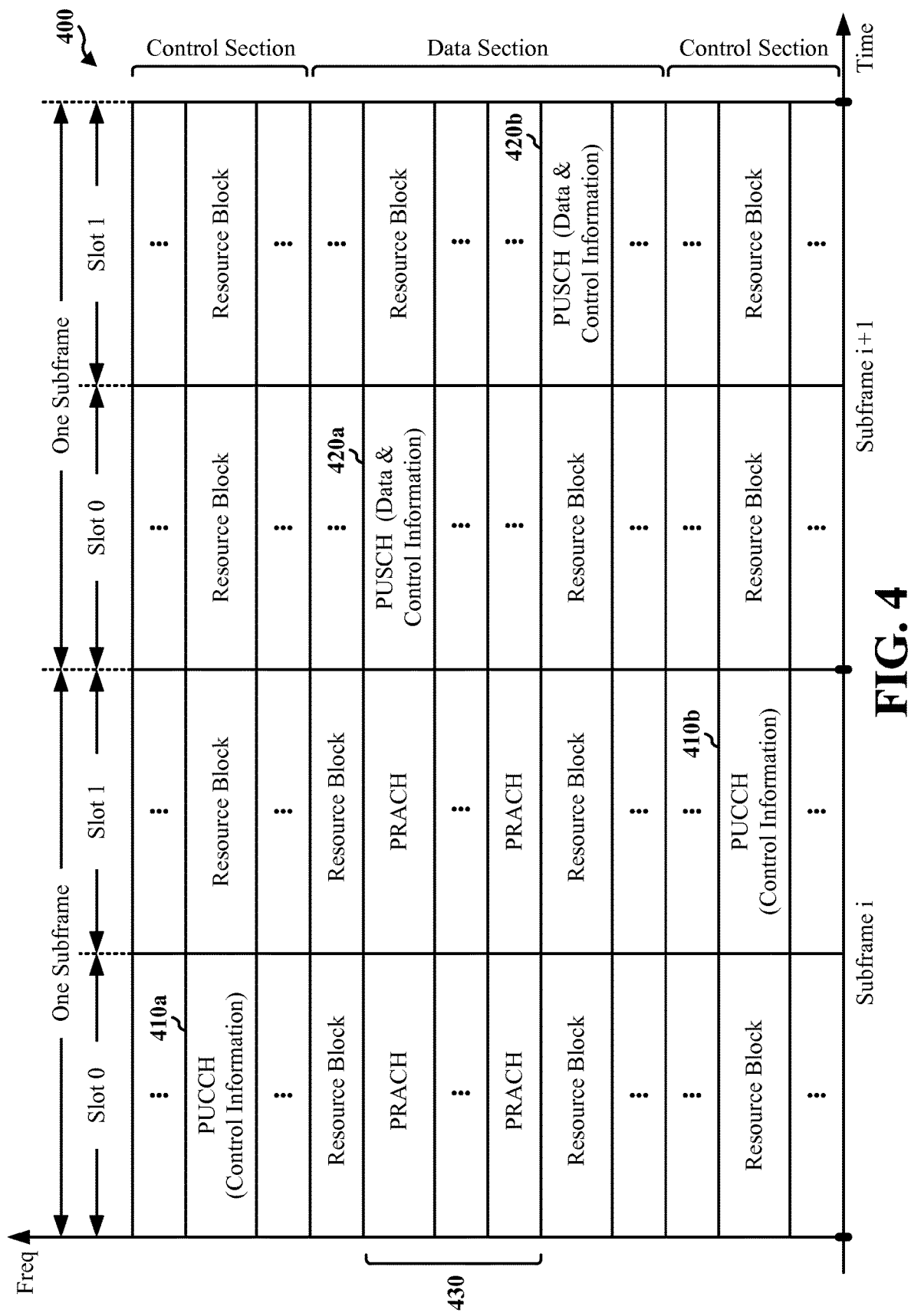
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
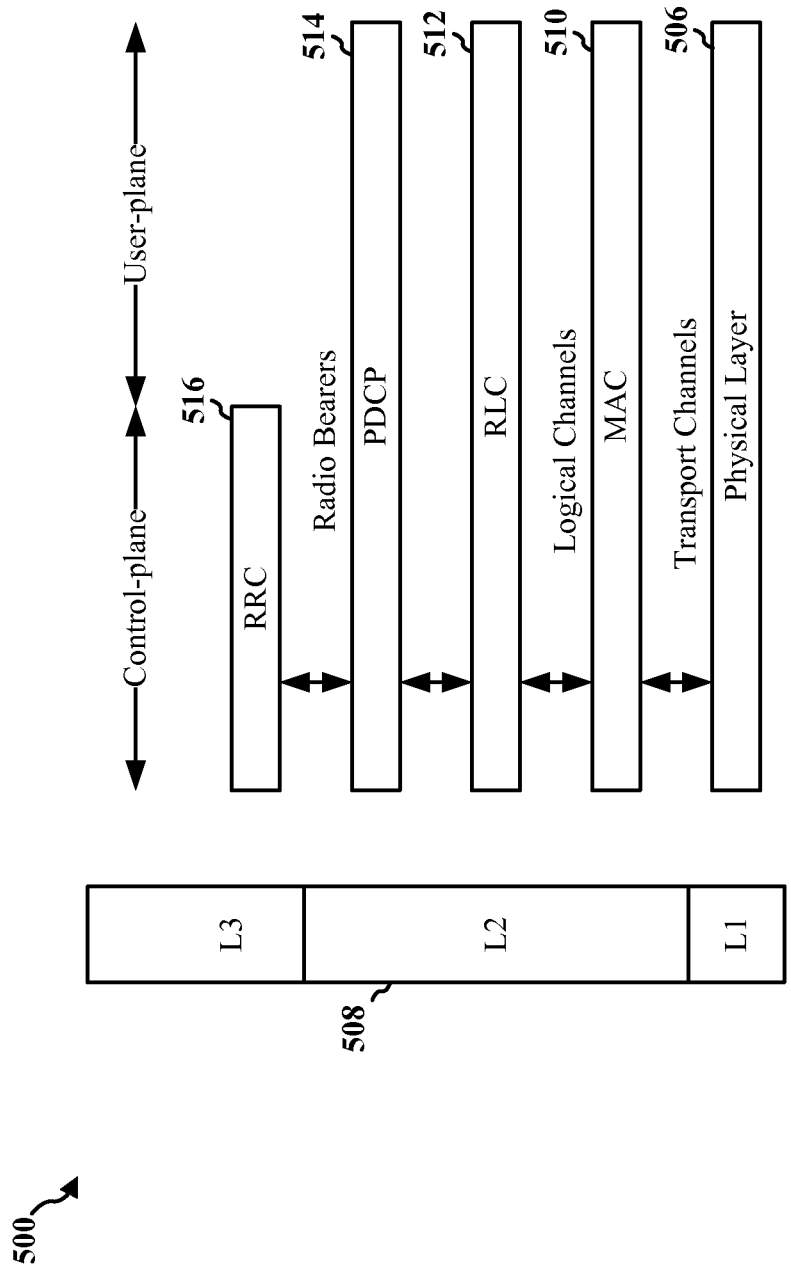
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
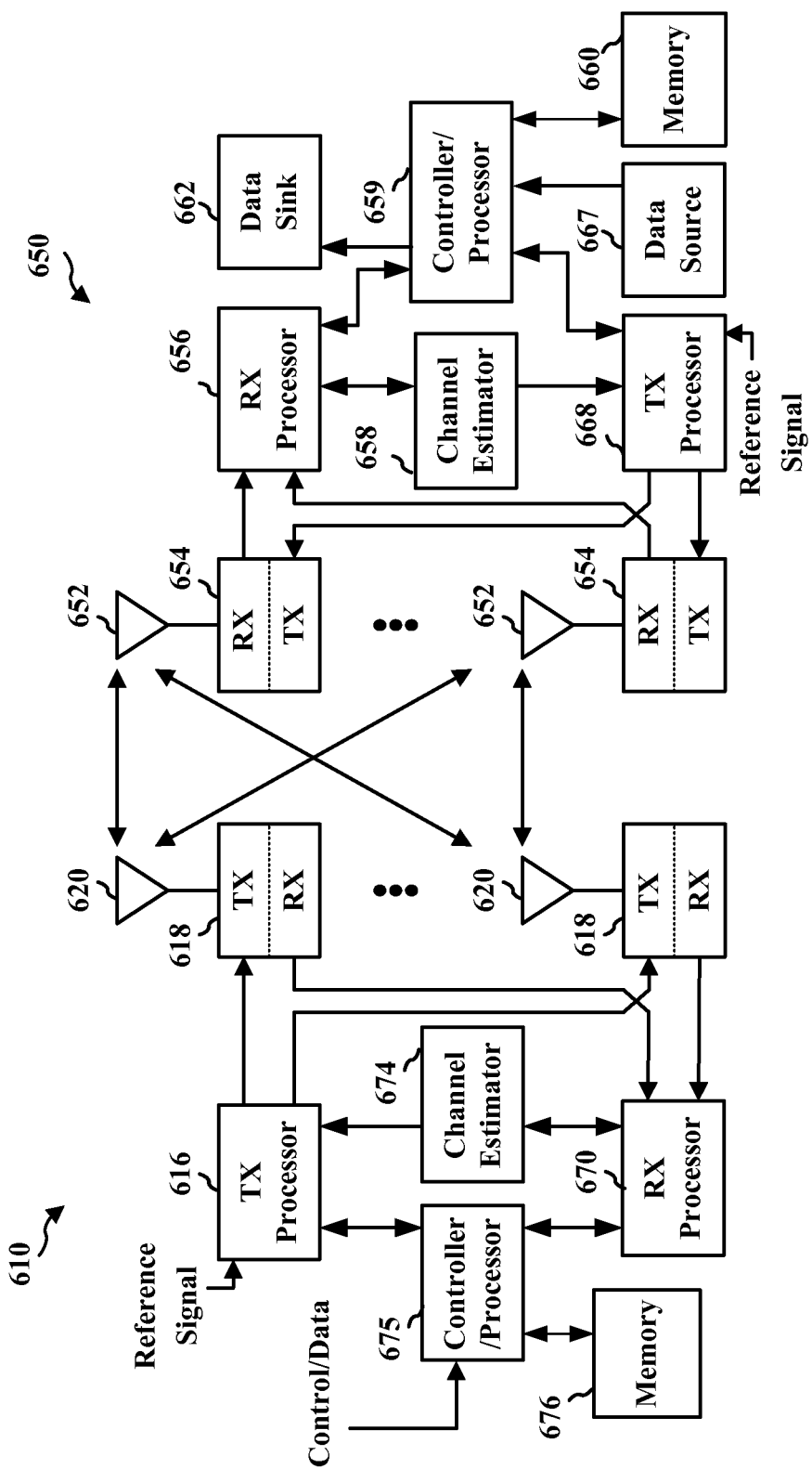
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
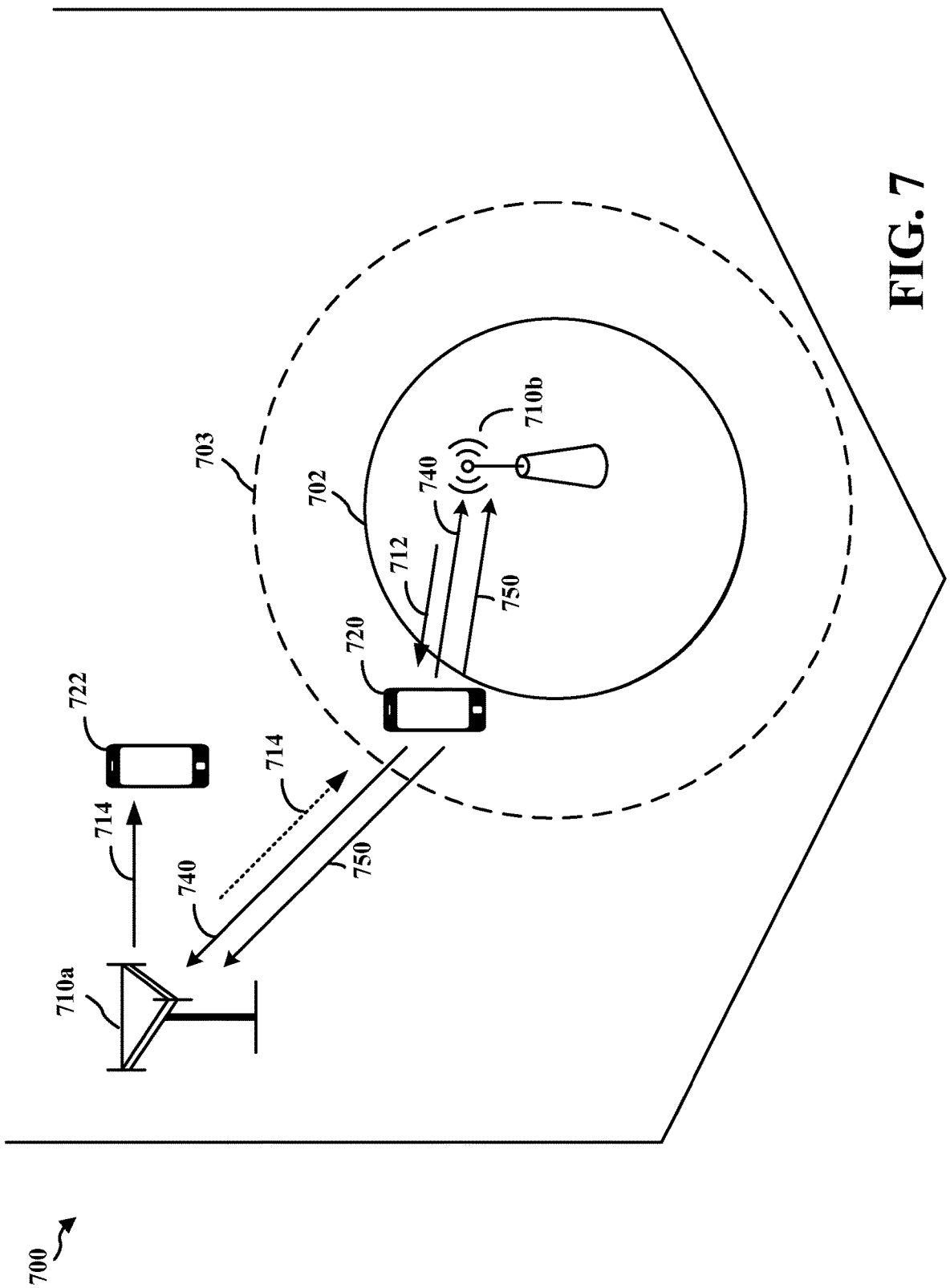
FIG. 7 is a diagram illustrating a range expanded cellular region in a heterogeneous network, including an aspect for managing interference.

FIG. 7 is a diagram 700 illustrating a range expanded cellular region in a heterogeneous network, including an aspect for managing interference. A lower power class eNB such as the pico eNB 710*b* may have a range expanded cellular region 703 that is expanded from the cellular region 702 through enhanced inter-cell interference coordination between the pico eNB 710*b* and the macro eNB 710*a* and through interference cancelation performed by the UE 720. In enhanced inter-cell interference coordination, the pico eNB 710*b* receives information from the macro eNB 710*a* regarding an interference condition of the UE 720. The information allows the pico eNB 710*b* to serve the UE 720 in the range expanded cellular region 703 and to accept a handoff of the UE 720 from the macro eNB 710*a* as the UE 720 enters the range expanded cellular region 703.

A UE may employ advanced decoding algorithms such as joint decoding of serving and interferer data (e.g., PDSCH) or interference cancelation (IC) of interferer transmissions for enabling the demodulating and decoding of serving cell data (e.g., PDSCH). In codeword level interference cancelation (CWIC), a UE attempts to decode an interfering transmission from a received transmission that includes both the interfering transmission and the serving base station transmission. Based on the decoded interfering transmission, the UE cancels the interfering transmission from the received transmission. The UE then demodulates and decodes the serving base station transmission from the interference canceled received transmission. In symbol level IC (SLIC), a UE estimates symbols transmitted by the interfering base station and cancels the interfering transmission from the received transmission based on the estimation. The UE then demodulates and decodes the serving base station transmission from the interference canceled received transmission.

When the MCS of the interfering PDSCH is picked independently of the UE that attempts to cancel the PDSCH, a UE may receive one or more interfering PDSCHs at signal to interference plus noise ratio (SINR) values not suitable for performing joint decoding or successive interference cancelation. The UE may then have to revert to single user decoding in which the UE treats the interfering transmission as noise. For example, the interfering PDSCH may have an MCS that is too high to decode correctly at the UE for CWIC or any other joint decoding or successive interference cancelation algorithm.

In a first exemplary method, the UE 720 determines an MCS that would facilitate interference suppression of an interfering transmission 714 from the eNB 710*a* (interfering base station). Interference suppression includes one or more of interference cancelation (e.g., CWIC or SLIC), reduced complexity maximum likelihood (R-ML) decoding in a network assisted inference cancelation (NAIC) context, and other techniques that allow the UE to exploit knowledge of parameters or statistics of the parameters of an interfering transmission 714. The UE 720 transmits information 740 indicating the determined MCS for the eNB 710*a*. The UE 720 may transmit the information 740 directly to the eNB 710*a* or may transmit the information 740 to the pico eNB 710*b*, which then provides the information 740 to the eNB 710*a*. The eNB 710*a* receives the information 740 indicating the MCS that would facilitate interference suppression by the UE 720 of the interfering transmission 714 from the eNB 710*a*. The eNB 710*a* then modulates and/or encodes data (e.g., PDSCH) based on the received information 740 indicating the MCS. The eNB 710*a* subsequently transmits the data to the UE 722, thereby generating the interfering transmission 714.

The UE 720 receives a transmission 712, 714 including a serving base station transmission 712 from the pico eNB 710*b* (serving base station) and the interfering transmission 714 from the eNB 710*a*. The UE 720 demodulates and/or decodes the serving base station transmission 712 from the received transmission 712, 714 based on an assumption that the interfering transmission 714 is modulated and/or encoded based on the determined MCS. In one configuration, before demodulating and decoding the serving base station transmission 712, the UE 720 suppresses, from the received transmission 712, 714, interference to the serving base station transmission 712 by the interfering transmission 714. The UE 720 may suppress the interference to the serving base station transmission 712 based on the determined MCS.

In one configuration, the UE 720 determines a channel quality indicator (CQI) associated with the determined MCS. In such a configuration, the information 740 indicating the determined MCS is information indicating the determined CQI. The information indicating the determined CQI may include at least one of a wideband CQI, a subband CQI for one or more subbands, a most preferred precoding matrix indicator (PMI), a least preferred PMI, or a rank indicator (RI). A least preferred PMI is one that causes minimum interference at the UE 720. The UE 720 may choose not to perform interference suppression, or may be unable to perform interference suppression, if the least preferred PMI is used. A most preferred PMI is one that maximizes interference at the UE 720, or otherwise increases interference to a level that can be detected, demodulated, decoded, or otherwise suppressed at the UE. Maximizing interference at the UE 720 may help the UE 720 with interference suppression, and in particular, with decoding the interfering signal. The PMI may be unnecessary if the eNB 710*a* uses transmission mode (TM) 3. With respect to the RI, the UE 720 may force RI to equal 1 for reasons such as implementation complexity and/or interference suppression accuracy.

The UE 720 may compute the CQI for a particular advanced decoding algorithm at the UE 720, such as joint decoding or successive interference cancelation. The UE 720 may determine the MCS corresponding to the CQI such that the UE can successfully demodulate and decode the serving base station transmission 712 using its advanced decoding algorithm. The number of interfering base stations with which the UE 720 performs the exemplary method may depend on receiver capability, the decoding algorithm implemented at the UE, signaling overhead, and other factors.

The eNB 710a may send the interfering transmission 714 that is modulated and/or encoded based on the determined MCS in particular predetermined subframes and/or subbands. Accordingly, the UE 720 may determine subframes and/or subbands on which the interfering transmission 714 will be modulated and encoded based on the determined MCS. The UE 720 may then determine whether to suppress interference from the received transmission 712, 714 based on whether the transmission is received in the determined subframes and/or subbands.

The eNB 710a may schedule UEs for receiving a downlink transmission based on the received information 740 indicating the MCS. The eNB 710a may schedule UEs for receiving a downlink transmission based on whether the UEs are able to receive the downlink transmission at the determined MCS. If the eNB 710a determines that the UE 722 can receive the interfering transmission 714 at the determined MCS, the eNB 710a may schedule the UE 722 to receive the interfering transmission 714.

As discussed supra, the eNB 710a modulates and/or encodes the interfering transmission 714 based on the determined MCS. The eNB 710a may modulate and/or encode the interfering transmission 714 with the determined MCS. Alternatively, the eNB 710a may modulate and/or encode the interfering transmission 714 with an MCS equal to or lower than the determined MCS. In one configuration, the eNB 710a determines the MCS for modulating and/or encoding the interfering transmission 714 based on a predetermined maximum MCS.

When the eNB 710a modulates and/or encodes the interfering transmission 714 based on a predetermined maximum MCS or with an MCS equal to or lower than an MCS received (directly or indirectly) from the UE 720, the pico eNB 710b may schedule UEs so that they can reliability suppress the interference from the eNB 710a. Accordingly, the UE 720 may receive downlink grants from the pico eNB 710b in which the downlink grants are based on the determined MCS utilized by the eNB 710a. The pico eNB 710b may schedule the UE 720 when the eNB 710a uses an MCS less than or equal to the MCS determined by the UE 720, and may refrain from scheduling the UE 720 when the eNB 710a uses an MCS that is greater than the MCS determined by the UE 720.

The UE 720 may determine the MCS for the eNB 710a based on an SINR associated with reference signals received from the eNB 710a. If the UE 720 is implementing successive SLIC, the UE 720 may determine a modulation order that the UE 720 can reliably suppress/cancel based on the SINR of the reference signals received from the eNB 710a. The UE 720 then determines a highest MCS associated with the determined modulation order. The UE 720 indicates the determined highest MCS in the information 740. If the UE 720 is implementing successive CWIC, the UE 720 determines an MCS that the UE 720 can reliably suppress/cancel based on the SINR of the reference signals received from the eNB 710a. The UE 720 indicates the determined MCS in the information 740. The UE 720 may adjust the determined MCS based on a previously determined MCS and an accuracy of a previous suppression of interference based on the previously determined MCS.

The reference signals may be CRS or channel state information (CSI) RS (CSI-RS) transmitted from the eNB 710a. When determining the SINR associated with reference signals received from the eNB 710a, the UE 720 may estimate the noise based on CRS transmissions from the pico eNB 710b and/or based on CSI-RS using interference management resources (IMRs).

The UE 720 sends the information 740 directly to the eNB 710a or to the pico eNB 710b, which may then forward the information 740 to the eNB 710a. If the pico eNB 710b receives the information 740, the pico eNB 710b may aggregate all MCS/CQI reports from served UEs (including the UE 720) and send one or more MCS/CQI reports to the eNB 710a of a function $f$ of the MCS/CQI reports to the eNB 710a. The function $f$ may include just the minimum of all MCS/CQI reports or the $k^{th}$ percentile of the MCS/CQI reports (e.g., 20%, 50%, etc).

The UE 720 may determine whether a previous interference suppression was successful, and transmit an ACK when the previous interference suppression is determined to be successful and transmit a NACK when the previous interference suppression is determined to be unsuccessful. The UE 720 may transmit the ACK/NACK 750 to the eNB 710a or to the pico eNB 710b. The pico eNB 710b may forward the ACK/NACK to the eNB 710a. When reported to the eNB 710a, the eNB 710a may bias the MCS used for modulating and/or encoding the interfering transmission 714. When reported to the pico eNB 710b, the pico eNB 710b may bias the MCS in the aggregated reports.

An example best demonstrates the exemplary method. Assume a CWIC capable UE receives a single data transmission including data transmissions from a serving eNB, a first interfering eNB, and a second interfering eNB. Further, assume the SNR from the serving eNB is 10 dB, the SNR from the first interfering eNB is 20 dB, and the SNR from the second interfering eNB is 13 dB. For simplicity, assume also that the UE can perform perfect cancelation if the UE can decode the signal to be canceled (possible with perfect channel estimation). For a single user decoding with additive white Gaussian noise (AWGN) interference, the serving CQI corresponds to an SINR of approximately −11 dB. The SNR is equal to $10 \log_{10} X$, where X is the power ratio. As such, an SNR of 10 dB corresponds to a power ratio of 10. An SNR of 20 dB corresponds to a power ratio of 100 and an SNR of 13 dB corresponds to a power ratio of approximately 20. For single user decoding with AWGN interference, the SINR corresponds to a power ratio of 10/(100+20), which corresponds to an SINR of approximately −11 dB. However, for CWIC decoding with decoding order being (1) the first interfering eNB, (2) the second interference eNB, and (3) the serving eNB, a UE reports a CQI for the first interfering eNB corresponding to an SINR of approximately 5 dB (i.e., an SINR corresponding to a power ratio of 100/(20+10), a CQI for the second interfering eNB corresponding to an SINR of approximately 3 dB (i.e., an SINR corresponding to a power ratio of 20/10), and a CQI for the serving eNB of 10 dB. If the first interfering eNB modulates and encodes its interfering data transmission based on an MCS/CQI corresponding to an SINR of 5 dB and the second interfering eNB modulates and encodes its interfering data transmission based on an MCS/CQI corresponding to an SINR of 3 dB, a UE that receives the interfering transmissions in a data transmission that also includes a serving transmission at 10 dB SNR may be able to demodulate and to decode the serving transmission from the data transmission.

In the example of FIG. 7, the interfering transmission 714 is from the eNB 710a.

However, the UE 720 may apply the exemplary methods to suppress an interfering transmission from the pico eNB 710b. Generally, in the exemplary methods, the UE 720 may determine an MCS that would facilitate interference suppression of an interfering first cell transmission from a first cell when decoding a second cell transmission from a second cell at the UE 720. The interfering first cell transmission is a transmission unintended for the UE 720 and the second cell transmission is a transmission intended for the UE 720. The UE 720 transmits information indicating the determined MCS for the first cell. The UE 720 receives a transmission including the second cell transmission from the second cell and the interfering first cell transmission from the first cell. The UE 720 demodulates the second cell transmission from the received transmission based on the determined MCS. The second cell belongs to the pico eNB 710b. The first cell belongs to the eNB 710a or the pico eNB 710b. When the first cell belongs to the pico eNB 710b, the first and second cells may be the same cell, e.g., in a MU-MIMO transmission, or different cells of the pico eNB 710b.

Figure 8:
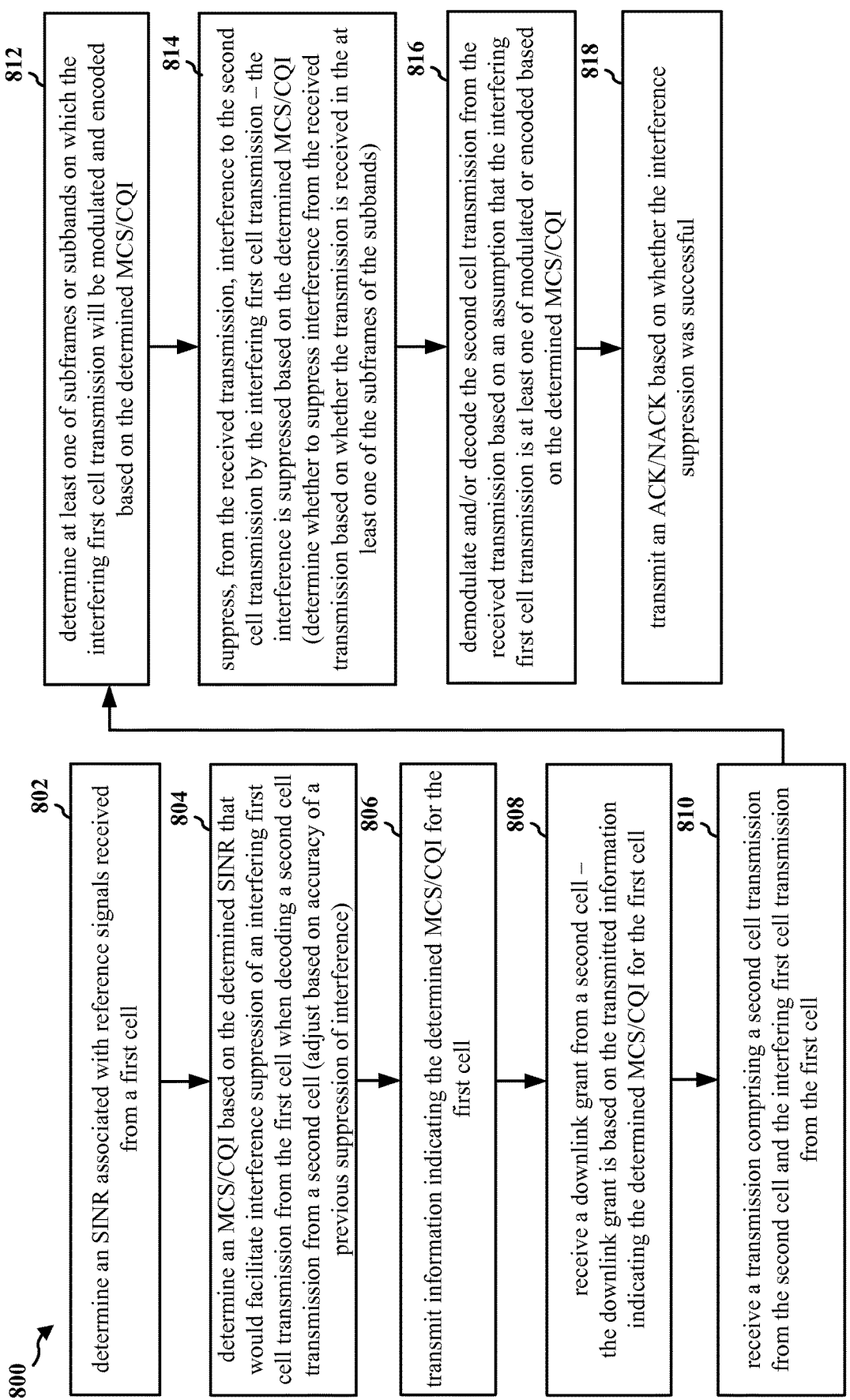
FIG. 8 is a flow chart of a first method of wireless communication.

FIG. 8 is a flow chart 800 of a method of wireless communication. The method may be performed by a UE, such as the UE 720. At step 802, the UE determines an SINR associated with reference signals received from a first cell. At step 804, the UE determines an MCS that would facilitate interference suppression of an interfering first cell transmission from the first cell when decoding a second cell transmission from a second cell. The interfering first cell transmission is a transmission unintended for the UE. The second cell transmission is a transmission intended for the UE. The interference suppression includes one or more of interference cancelation (e.g., CWIC or SLIC), R-ML decoding in an NAIC context, and other techniques that allow the UE to exploit knowledge of parameters or statistics of the parameters of an interfering first cell transmission. The first cell and the second cell may be the same cell or different cells. When the first and second cells are different cells, they may belong to the same eNB or different eNBs. The UE determines the MCS based on the determined SINR. In one configuration, the UE determines a CQI associated with the determined MCS. The CQI may be one or more of a wideband CQI, a subband CQI for one or more subbands, a most preferred PMI, a least preferred PMI, or a RI. If the UE is performing SLIC, the UE may determine a modulation order that the UE can reliably suppress based on the determined SINR, and determine a highest MCS associated with the determined modulation order. The UE may then determine the MCS to be the highest MCS. If the UE is performing CWIC, the UE may determine the MCS to be an MCS that the UE can reliably suppress based on the SINR.

At step 804, the UE may also adjust the determined MCS based on a previously determined MCS and an accuracy of a previous suppression of interference based on the previously determined MCS. If the accuracy of the previous suppression of interference is less than a first threshold (i.e., the previous suppression of interference was inaccurate), the UE may adjust the determined MCS to be lower, and if the accuracy of the previous suppression of interference is greater than a second threshold (i.e., the previous suppression of interference was accurate), the UE may adjust the determined MCS to be higher.

At step 804, the UE may determine the MCS further based on a predetermined maximum MCS for the interfering first cell transmission. In such a configuration, the UE may reduce the determined MCS to the predetermined maximum MCS and report the predetermined maximum MCS. In one configuration, the first cell and the second cell may agree on a maximum MCS that can be used by the first cell. In another configuration, the first cell may use an MCS less than or equal to a predetermined maximum MCS for particular subframes/subbands. If the UE determines an MCS that is greater than the predetermined maximum MCS for the particular subframes/subbands, the UE may report the predetermined maximum MCS rather than the determined MCS. Accordingly, the UE may reduce the determined MCS to the predetermined maximum MCS and report the determined reduced MCS.

At step 806, the UE transmits information indicating the determined MCS/CQI for the first cell. The UE may transmit the information to the second cell or the first cell. If the UE transmits the information to the second cell, the second cell may aggregate received MCS/CQI information and forward the aggregated information or a portion of the aggregated information to the first cell.

At step 808, the UE may receive a downlink grant from the second cell in which the downlink grant is based on the transmitted information indicating the determined MCS for the first cell. As discussed supra, the second cell may schedule UEs that can reliably suppress the interference from the first cell. Specifically, the second cell may schedule the UE for a downlink transmission based on whether the first cell is sending its downlink transmission with an MCS that is less than or equal to the determined MCS. If the first cell is sending its downlink transmission at an MCS less than or equal to a maximum MCS in which the maximum MCS is known to the second cell, the second cell may schedule the UE when the UE reports at step 806 an MCS that is greater than or equal to the maximum MCS.

At step 810, the UE receives a transmission including a second cell transmission from the second cell and an interfering first cell transmission from the first cell. The interfering first cell transmission may be modulated and/or encoded based on the determined MCS for the first cell. Specifically, in a first configuration, the interfering first cell transmission is modulated and/or encoded with the determined MCS for the first cell. In a second configuration, the interfering first cell transmission is modulated and/or encoded with an MCS equal to or lower than the determined MCS. When the interfering first cell transmission is modulated and/or encoded with the MCS indicated at step 806, the indicated MCS may be higher than when the interfering first cell transmission is modulated and/or encoded with an MCS less than or equal to the MCS indicated at step 806. That is, the UE may indicate a first MCS when the UE knows exactly the MCS that the first cell will use, and may indicate a second MCS less than the first MCS when the UE knows that the first cell will use an MCS less than or equal to indicated MCS.

At step 812, the UE determines at least one of subframes or subbands on which the interfering first cell transmission will be modulated and encoded based on the determined MCS. For example, referring to FIG. 7, the UE 720 may receive information indicating the subframes/subbands from the pico eNB 710b. The eNB 710a and the pico eNB 710b may agree on the subframes/subbands on which the eNB 710a will respect the MCS/CQI report (modulate and/or encode based on the reported MCS/CQI) from the UE.

At step 814, the UE determines whether to suppress interference from the received transmission based on whether the transmission is received in the subframes/subbands. If the transmission is received in subframes/subbands on which the interfering first cell transmission is modulated and/or encoded based on the determined MCS, the UE may suppress, from the received transmission, interference to the second cell transmission by the interfering first cell transmission.

The UE may suppress the interference based on knowledge that the interfering first cell transmission is modulated and/or encoded based on the MCS determined and transmitted at steps 804, 806.

At step 816, the UE demodulates and/or decodes the second cell transmission from the received transmission based on an assumption that the interfering first cell transmission is at least one of modulated or encoded based on the determined MCS. At step 818, the UE may determine whether the interference suppression was successful. If the interference suppression is determined to be successful, the UE may transmit an ACK. If the interference is determined to be unsuccessful, the UE may transmit a NACK. The UE may transmit the ACK/NACK to either of the first cell or the second cell. If transmitted to the second cell, the second cell may bias the MCS/CQI aggregated reports based on the received ACK/NACK. If transmitted to the first cell, the first cell may bias the MCS based on the received ACK/NACK. Specifically, the first cell may decrease the MCS when a NACK is received and increase the MCS when an ACK is received. In some configurations, the first cell may increase the MCS when an ACK is received only if the MCS was previously decreased based on a received NACK. Accordingly, at 804, the UE may determine whether a previous interference suppression was successful. The UE may transmit an ACK when the previous interference suppression is determined to be successful, and transmit a NACK when the previous interference suppression is determined to be unsuccessful. In such a configuration, the interfering first cell transmission from the first cell is modulated and/or encoded based on the determined MCS and based on whether the UE transmits an ACK or a NACK in response to the previous interference suppression.

Figure 9:
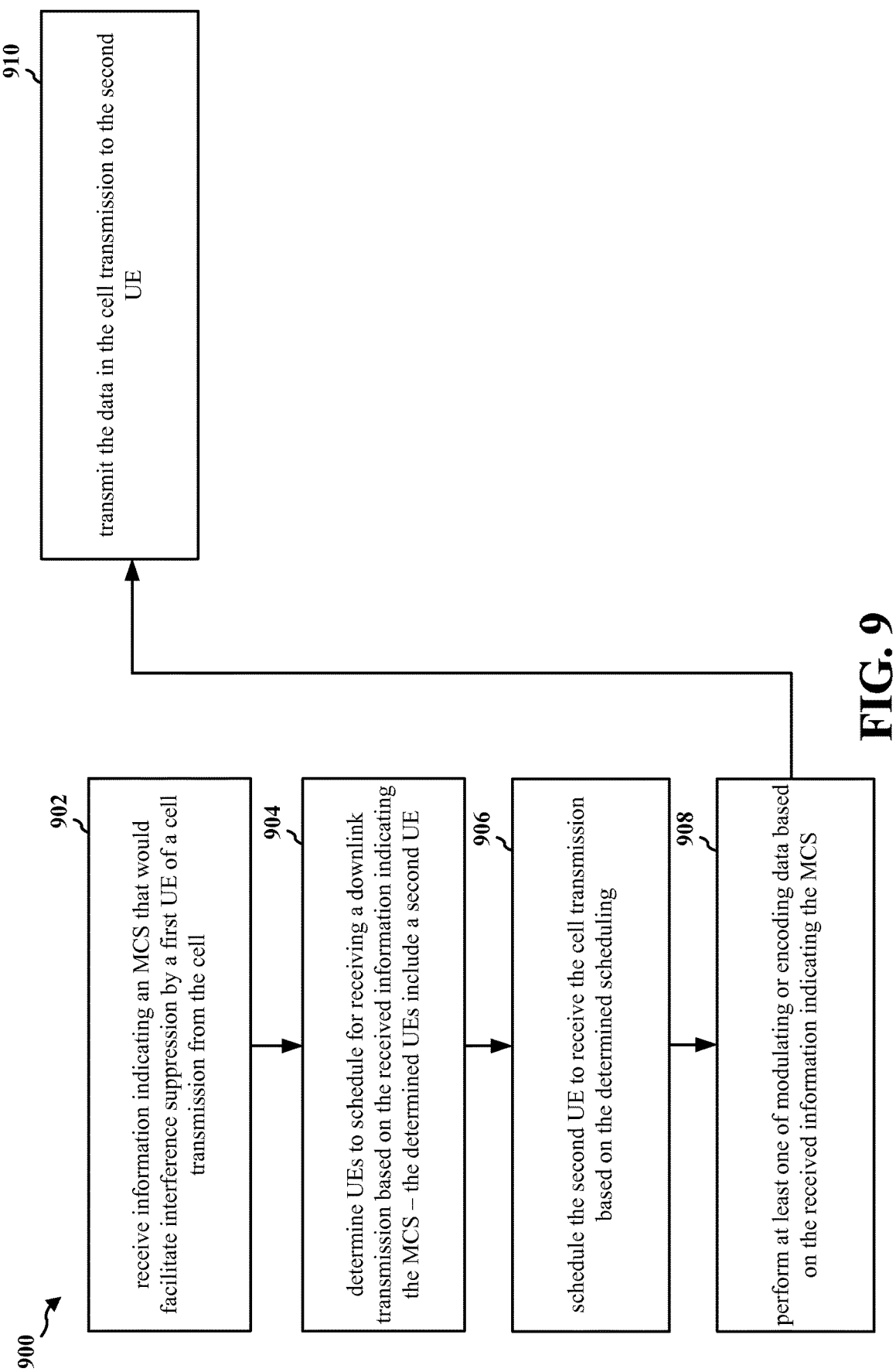
FIG. 9 is a flow chart of a second method of wireless communication.

FIG. 9 is a flow chart 900 of a method of wireless communication. The method may be performed by an eNB, such as the interfering eNB 710a. At step 902, a cell receives information indicating an MCS that would facilitate interference cancelation by a first UE (e.g., the UE 720) of a cell transmission from the cell. At step 904, the cell may determine UEs to schedule for receiving a downlink transmission based on the received information indicating the MCS. The determined UEs include a second UE. The cell may determine to utilize the indicated MCS for the downlink transmission or to utilize an MCS less than or equal to the indicated MCS. The cell may determine to schedule the UEs that can reliably decode and demodulate the downlink transmission at the to-be-utilized MCS that the cell determines to utilize for the downlink transmission. UEs that need a lower MCS than the to-be-utilized MCS in order to reliably demodulate/decode the downlink transmission may be scheduled at other times when the cell is not limited by the indicated MCS.

At step 906, the cell schedules the second UE to receive a cell transmission based on the determined scheduling. Accordingly, the cell determined that the second UE can reliably demodulated/decode the downlink transmission at the to-be-utilized MCS. The to-be-utilized MCS may be the indicated MCS or an MCS less than or equal to the indicated MCS.

At step 908, the cell modulates and/or encodes data based on the received information indicating the MCS. The cell modulates and/or encodes data at the indicated MCS or at an MCS less than or equal to the indicated MCS. At step 910, the cell transmits the data in the cell transmission to the second UE.

At step 902, the information indicating the received MCS may be received from the first UE or from a second cell serving the first UE. As discussed supra, the cell determines the UEs for receiving the downlink transmission at steps 904, 906 based on whether the UEs are able to receive the downlink transmission at the indicated MCS or an MCS less than or equal to the indicated MCS. The information indicating the MCS may be information indicating a CQI.

At step 908, the cell may modulate and/or encode the data with the indicated MCS or with an MCS less than or equal to the indicated MCS. The cell may modulate and/or encode the data with an MCS less than or equal to the indicated MCS when the cell and the second cell agree on a maximum MCS that can be used for the downlink transmission.

Figure 10:
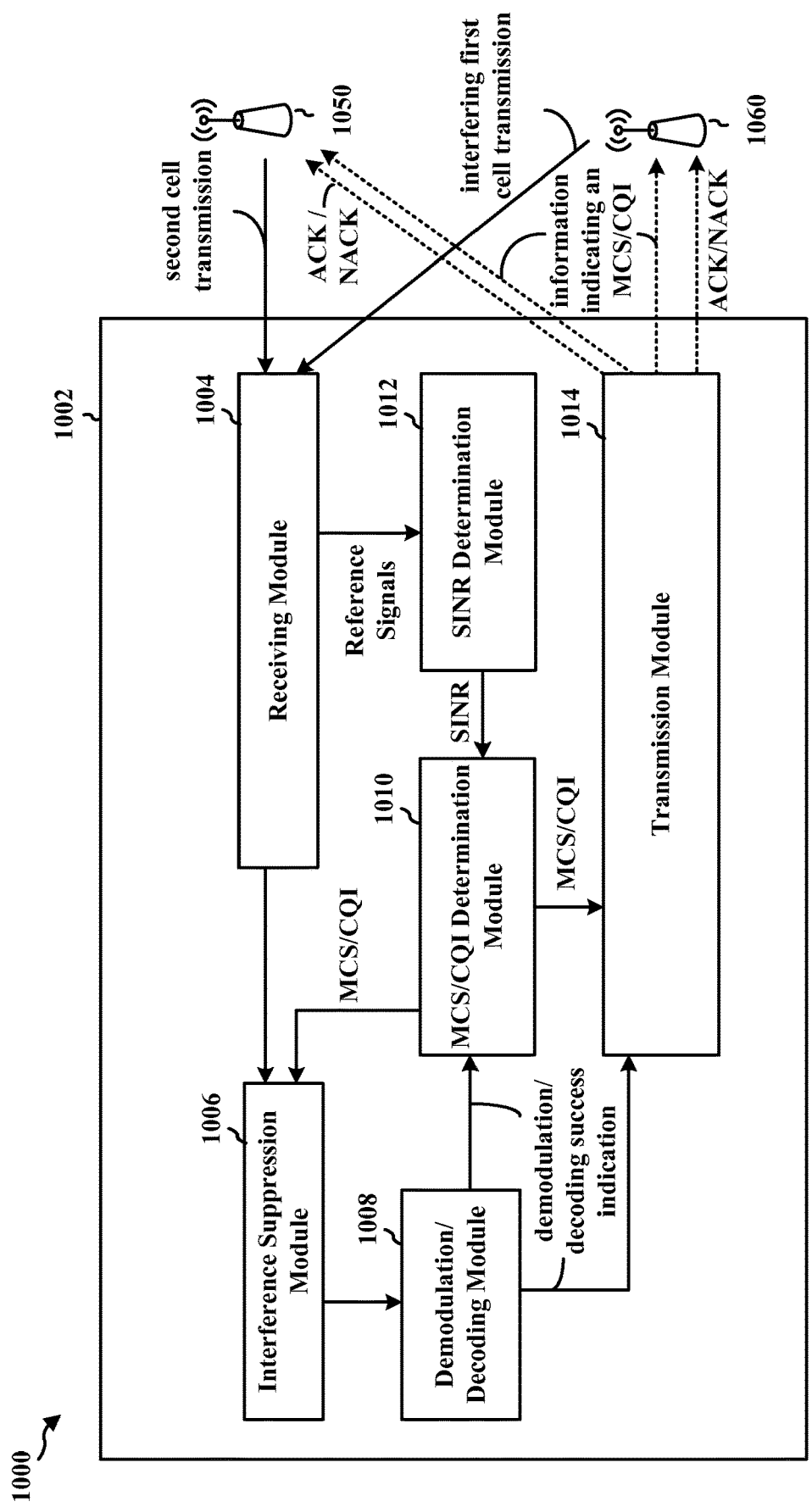
FIG. 10 is a conceptual data flow diagram illustrating the data flow between different modules/means/components in an exemplary apparatus.

FIG. 10 is a conceptual data flow diagram 1000 illustrating the data flow between different modules/means/components in an exemplary apparatus 1002. The apparatus may be a UE. The UE includes an MCS/CQI determination module 1010 that is configured to determine an MCS that would facilitate interference suppression of an interfering first cell transmission from a first cell 1060 when decoding a second cell transmission from a second cell 1050 at the UE. The interfering first cell transmission is a transmission unintended for the UE and the second cell transmission is a transmission intended for the UE. The UE further includes a transmission module 1014 that is configured to transmit information indicating the determined MCS for the first cell 1060. The UE further includes a receiving module 1004 that is configured to receive a transmission including a second cell transmission from a second cell 1050 and the interfering first cell transmission from the first cell 1060. The UE further includes demodulating/decoding module 1008 that is configured to demodulate and/or to decode the second cell transmission from the received transmission based on an assumption that the interfering first cell transmission is at least one of modulated or encoded based on the determined MCS. The UE may further include an interference suppression module 1006 that is configured to suppress, from the received transmission, interference to the second cell transmission by the interfering first cell transmission. The interference suppression module 1006 is configured to suppress the interference based on the determined MCS. The transmission module 1014 may be configured to transmit the information indicating the determined MCS to one of the second cell 1050 or the first cell 1060. The MCS/CQI determination module 1010 may be configured to determine a CQI associated with the determined MCS. In such a configuration, the transmission module 1014 is configured to transmit information indicating the determined CQI. The information indicating the determined CQI may include at least one of a wideband CQI, a subband CQI for one or more subbands, a most preferred PMI, a least preferred PMI, or an RI. The receiving module 1004 may be configured to receive a downlink grant from the second cell 1050. The downlink grant may be based on the transmitted information indicating the determined MCS for the first cell 1060. The interfering first cell transmission may be modulated and encoded based on the determined MCS for the first cell 1060. The interference suppression module 1006 may be configured to determine at least one of subframes or subbands on which the interfering first cell transmission will be modulated and encoded based on the determined MCS, and to determine whether to suppress interference from the received transmission based on whether the transmission is received in the at least one of the subframes of the subbands. The interfering first cell transmission may be modulated and encoded with the determined MCS. Alternatively, the interfering first cell transmission may be modulated and encoded with an MCS equal to or lower than the determined MCS. The MCS may be determined based on a predetermined maximum MCS for the interfering first cell transmission. The UE may further include an SINR determination module 1012 that is configured to determine an SINR associated with reference signals received from the first cell 1060. The MCS/CQI determination module 1010 may be configured to determine the MCS based on the determined SINR. The MCS/CQI determination module 1010 may be configured to determine a modulation order based on the determined SINR, and to determine a highest MCS associated with the determined modulation order. In such a configuration, the MCS/CQI determination module 1010 is configured to determine the MCS to be the determined highest MCS. The MCS/CQI determination module 1010 may be configured to adjust the determined MCS based on a previously determined MCS and an accuracy of a previous suppression of interference based on the previously determined MCS. The demodulating/decoding module 1008 may be configured to determine whether a previous interference suppression was successful and to inform the transmission module 1014 whether the demodulating/decoding was successful/unsuccessful. In such a configuration, the transmission module 1014 may be configured to transmit an ACK when the previous interference suppression is determined to be successful, and to transmit a NACK when the previous interference suppression is determined to be unsuccessful. The interfering first cell transmission from the first cell 1060 may be modulated and encoded based on the determined MCS and based on whether the UE transmits an ACK or a NACK in response to the previous interference suppression.

The apparatus may include additional modules that perform each of the steps of the algorithm in the aforementioned flow chart of FIG. 8. As such, each step in the aforementioned flow chart of FIG. 8 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 11:
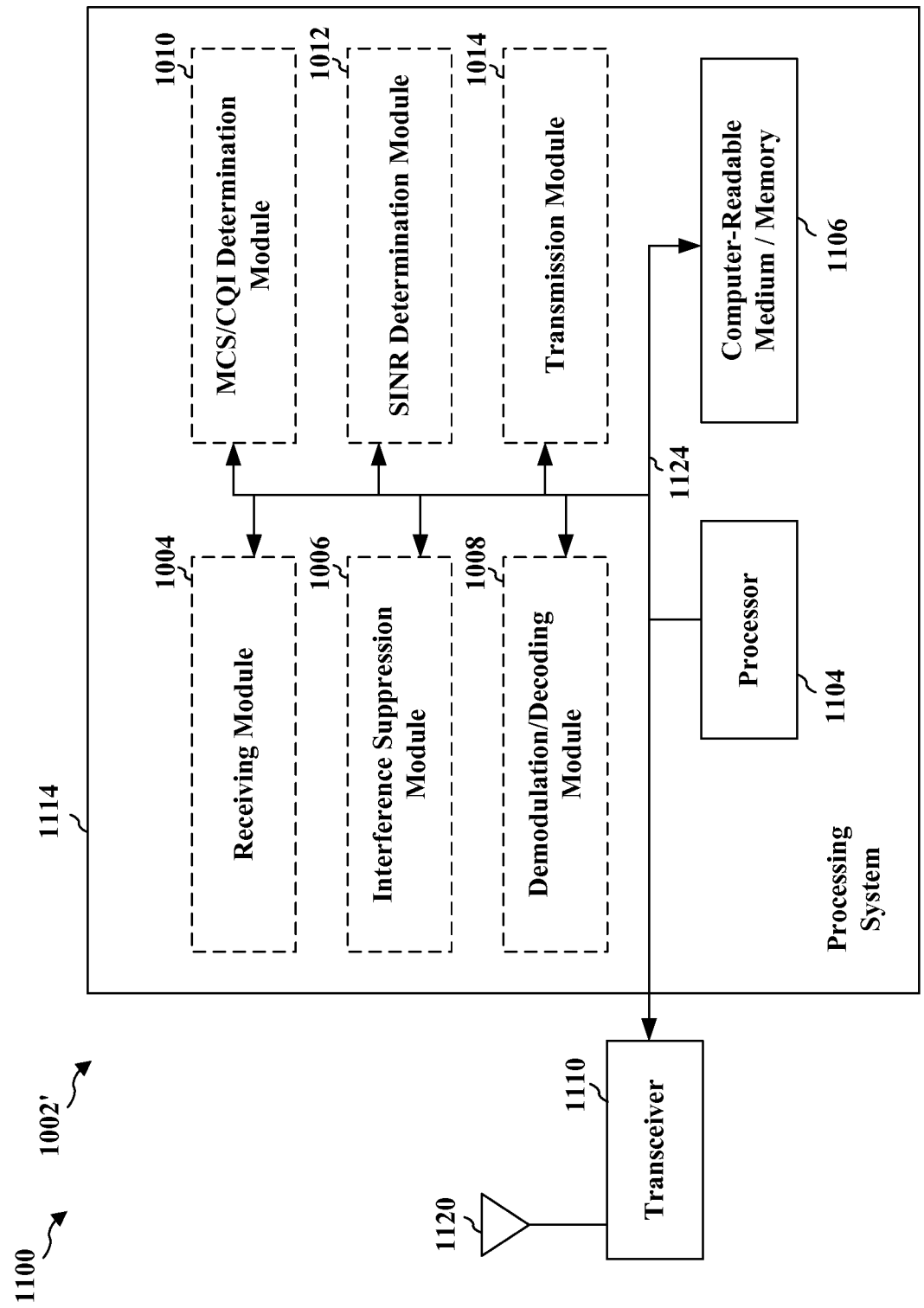
FIG. 11 is a diagram illustrating an example of a hardware implementation for an apparatus employing a processing system.

FIG. 11 is a diagram 1300 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1104, the modules 1004, 1006, 1008, 1010, 1012, 1014, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1310. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114. In addition, the transceiver 1110 receives information from the processing system 1114, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system further includes at least one of the modules 1004, 1006, 1008, 1010, 1012, 1014. The modules may be software modules running in the processor 1104, resident/stored in the computer readable medium/memory 1106, one or more hardware modules coupled to the processor 1104, or some combination thereof. The processing system 1114 may be a component of the UE 650 and may include the memory 660 and/or at least one of the TX processor 668, the RX processor 656, and the controller/processor 659.

In one configuration, the apparatus 1002/1002' for wireless communication includes means for determining an MCS that would facilitate interference suppression of an interfering first cell transmission from a first cell when decoding a second cell transmission from a second cell at the UE. The interfering first cell transmission is a transmission unintended for the UE. The second cell transmission is a transmission intended for the UE. The apparatus further includes means for transmitting information indicating the determined MCS for the first cell, means for receiving a transmission comprising the second cell transmission from the second cell and the interfering first cell transmission from the first cell, and means for performing at least one of demodulating or decoding the second cell transmission from the received transmission based on the determined MCS. The means for performing may be configured to demodulate the second cell transmission from the received transmission based on an assumption that the interfering first cell transmission is at least one of modulated or encoded based on the determined MCS. The means for performing may be configured to decode the second cell transmission from the received transmission based on an assumption that the interfering first cell transmission is at least one of modulated or encoded based on the determined MCS. The apparatus may further include means for suppressing, from the received transmission, interference to the second cell transmission by the interfering first cell transmission, the interference being suppressed based on the determined MCS. The apparatus may further include means for determining a CQI associated with the determined MCS. The information indicating the determined MCS may include information indicating the determined CQI. The apparatus may further include means for receiving a downlink grant from the second cell. The downlink grant may be based on the transmitted information indicating the determined MCS for the first cell. In one configuration, the interfering first cell transmission is modulated and encoded based on the determined MCS for the first cell. In such a configuration, the apparatus may further include means for determining at least one of subframes or subbands on which the interfering first cell transmission will be modulated and encoded based on the determined MCS, and means for determining whether to suppress interference from the received transmission based on whether the transmission is received in the at least one of the subframes of the subbands. The apparatus may further include means for determining SINR associated with reference signals received from the first cell. The MCS may be determined based on the determined SINR. The apparatus may further include means for determining a modulation order based on the determined SINR, and means for determining a highest MCS associated with the determined modulation order. The determined MCS may be the determined highest MCS. The apparatus may further include means for adjusting the determined MCS based on a previously determined MCS and an accuracy of a previous suppression of interference based on the previously determined MCS. The apparatus may further include means for determining whether a previous interference suppression was successful, means for transmitting an ACK when the previous interference suppression is determined to be successful, and means for transmitting a NACK when the previous interference suppression is determined to be unsuccessful. The interfering first cell transmission from the first cell may be modulated and encoded based on the determined MCS and on whether the UE transmits an ACK or a NACK in response to the previous interference suppression.

The aforementioned means may be one or more of the aforementioned modules of the apparatus 1002 and/or the processing system 1114 of the apparatus 1002' configured to perform the functions recited by the aforementioned means. As described supra, the processing system 1114 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 12:
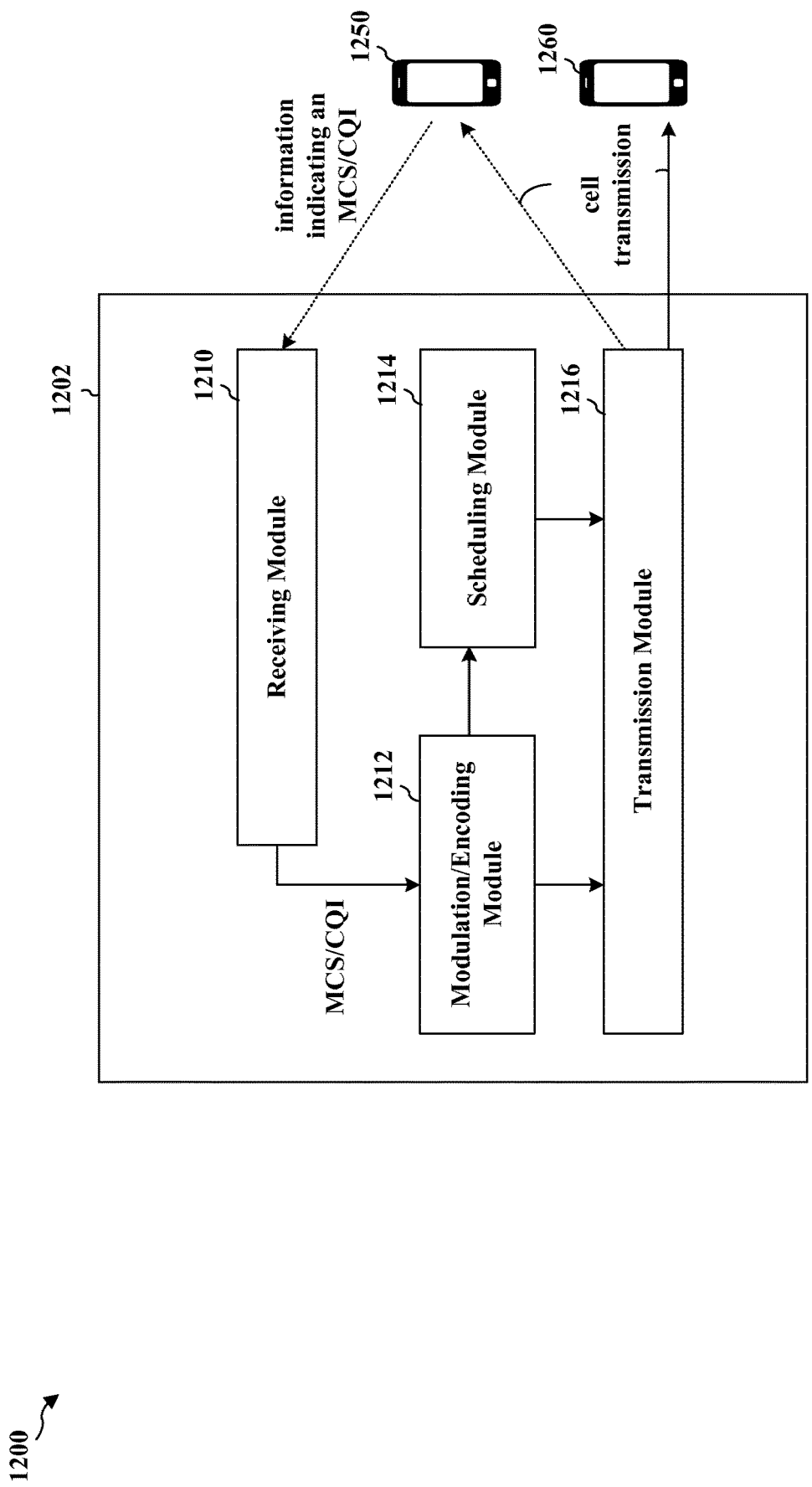
FIG. 12 is a conceptual data flow diagram illustrating the data flow between different modules/means/components in an exemplary apparatus.

FIG. 12 is a conceptual data flow diagram 1200 illustrating the data flow between different modules/means/components in an exemplary apparatus 1202. The apparatus may be an eNB, such as the interfering base station 710a. The cell includes a receiving module 1210 that is configured to receive information indicating an MCS that would facilitate interference suppression by a first UE 1250 of a cell transmission from the cell. The cell further includes a modulation/encoding module 1212 that is configured to perform at least one of modulating or encoding data based on the received information indicating the MCS. The cell further includes a transmission module 1216 that is configured to transmit the data in a cell transmission to a second UE 1260. The information indicating the received MCS may be received from the first UE 1250 or from a second cell serving the first UE 1250. The cell may further include a scheduling module 1214 that is configured to determine UEs to schedule for receiving a downlink transmission based on the received information indicating the MCS. The determined UEs include the second UE 1260. The scheduling module 1214 may be further configured to schedule the second UE 1260 to receive the cell transmission based on the determined scheduling. The scheduling module 1214 may be configured to determine the UEs for receiving the downlink transmission based on whether the UEs are able to receive the downlink transmission at the MCS. The information indicating the MCS may be information indicating a CQI. The modulation/encoding module 1212 may be configured to modulate and/or encode the data with the received MCS or with an MCS less than or equal to the indicated MCS.

The apparatus may include additional modules that perform each of the steps of the algorithm in the aforementioned flow chart of FIG. 9. As such, each step in the aforementioned flow chart of FIG. 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 13:
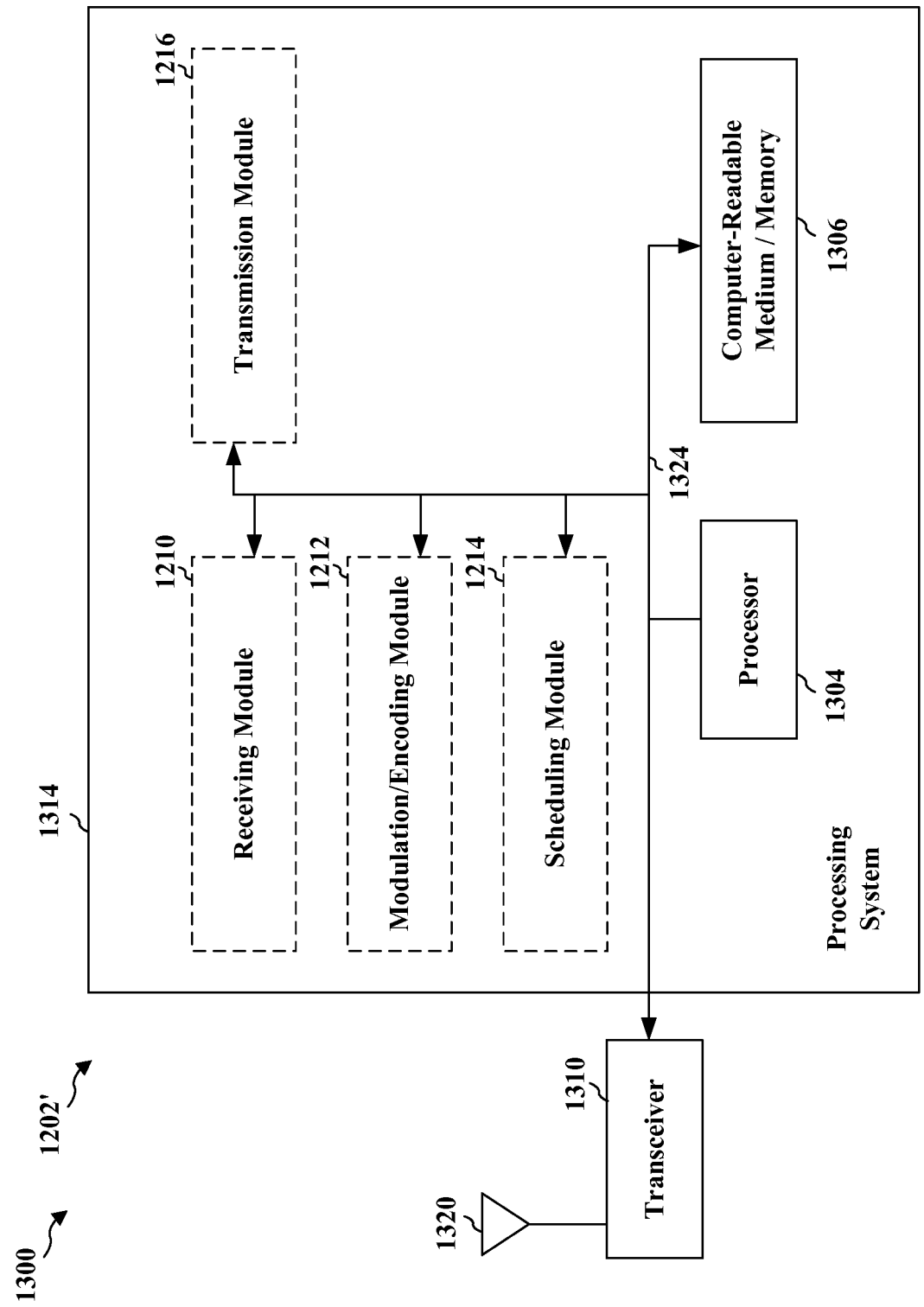
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1210, 1212, 1214, 1216, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314. In addition, the transceiver 1310 receives information from the processing system 1314, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus.

The computer-readable medium/memory 1306 may also be used for storing data that is manipulated by the processor 1304 when executing software. The processing system further includes at least one of the modules 1210, 1212, 1214, 1216. The modules may be software modules running in the processor 1304, resident/stored in the computer readable medium/memory 1306, one or more hardware modules coupled to the processor 1304, or some combination thereof. The processing system 1314 may be a component of the eNB 610 and may include the memory 676 and/or at least one of the TX processor 616, the RX processor 670, and the controller/processor 675.

In one configuration, the apparatus 1202/1202' for wireless communication includes means for receiving information indicating an MCS that would facilitate interference suppression by a first UE of a cell transmission from the cell, means for performing at least one of modulating or encoding data based on the received information indicating the MCS, and means for transmitting the data in the cell transmission to a second UE. The apparatus further include means for determining UEs to schedule for receiving a downlink transmission based on the received information indicating the MCS. The determined UEs include the second UE. The apparatus further includes means for scheduling the second UE to receive the cell transmission based on the determined scheduling.

The aforementioned means may be one or more of the aforementioned modules of the apparatus 1202 and/or the processing system 1314 of the apparatus 1202' configured to perform the functions recited by the aforementioned means. As described supra, the processing system 1314 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of operating a user equipment (UE), comprising:
   determining a signal to interference plus noise ratio (SINK) associated with reference signals received from a first cell;
   determining a modulation order based on the determined SINR;
   determining, based at least in part on the modulation order, a modulation and coding scheme (MCS) for an interfering first cell transmission that would facilitate interference suppression of the interfering first cell transmission from the first cell when decoding a second cell transmission from a second cell at the UE, the interfering first cell transmission being a transmission unintended for the UE, the second cell transmission being a transmission intended for the UE, wherein the MCS is determined based on a predetermined maximum MCS for the interfering first cell transmission;
   adjusting the determined MCS based on a previously determined MCS and an accuracy of a previous suppression of interference based on the previously determined MCS;
   determining at least one of subframes or subbands on which the interfering first cell transmission will be modulated and encoded based on the determined MCS;
   transmitting at least one of an acknowledgement (ACK) indicating that a previous interference suppression by the UE was successful or a negative ACK (NACK) indicating that the previous interference suppression by the UE was unsuccessful;
   transmitting, from the UE to the first cell, information indicating the determined MCS;
   receiving a transmission comprising the second cell transmission from the second cell and the interfering first cell transmission from the first cell, wherein the interfering first cell transmission is modulated and encoded based on the determined MCS;
   determining whether to suppress interference from the received transmission based on whether the transmission is received in the at least one of the subframes or the subbands;
   suppressing, from the received transmission, interference to the second cell transmission by the interfering first cell transmission, the interference being suppressed based on the determined MCS; and
   performing, at the UE, at least one of demodulating or decoding the second cell transmission from the received transmission based on the determined MCS.

2. The method of claim 1, wherein the performing comprises demodulating and the demodulating the second cell transmission from the received transmission is based on an assumption that the interfering first cell transmission is at least one of modulated or encoded based on the determined MCS.

3. The method of claim 1, wherein the performing comprises decoding and the decoding the second cell transmission from the received transmission is based on an assumption that the interfering first cell transmission is at least one of modulated or encoded based on the determined MCS.

4. The method of claim 1, wherein the information indicating the determined MCS is transmitted to one of the second cell or the first cell.

5. The method of claim 1, further comprising determining a channel quality indicator (CQI) associated with the determined MCS, wherein the information indicating the determined MCS comprises information indicating the determined CQI.

6. The method of claim 5, wherein the information indicating the determined CQI comprises at least one of a wideband CQI, a subband CQI for one or more subbands, a most preferred precoding matrix indicator (PMI), a least preferred PMI, or a rank indicator (RI).

7. The method of claim 1, further comprising receiving a downlink grant from the second cell, the downlink grant being based on the transmitted information indicating the determined MCS for the first cell.

8. The method of claim 1, wherein the interfering first cell transmission is modulated and encoded with the determined MCS.

9. The method of claim 1, wherein the interfering first cell transmission is modulated and encoded with an MCS equal to or lower than the determined MCS.

10. The method of claim 1, further comprising:
determining a highest MCS associated with the determined modulation order,
wherein the determined MCS is the determined highest MCS.

11. The method of claim 1, further comprising:
determining whether the previous interference suppression was successful prior to transmitting the at least one of the ACK or NACK;
wherein the ACK is transmitted when the previous interference suppression is determined to be successful; and
wherein the NACK is transmitted when the previous interference suppression is determined to be unsuccessful,
wherein the interfering first cell transmission from the first cell is modulated and encoded based on the determined MCS and on whether the UE transmits an ACK or a NACK in response to the previous interference suppression.

12. The method of claim 1, wherein the first cell and the second cell are a same cell.

13. The method of claim 1, wherein the first cell and the second cell are different cells and belong to one of different base stations or a same base station.

14. A method of communication using a cell, comprising:
receiving information indicating a modulation and coding scheme (MCS) for a cell transmission from the cell that would facilitate interference suppression by a first user equipment (UE) of the cell transmission from the cell, wherein the MCS is determined based at least in part on a modulation order and a predetermined maximum MCS, and wherein the modulation order is based on a signal to interference plus noise ratio (SINR) associated with reference signals sent from the cell, wherein the received information indicating the MCS is sent to the cell from the first UE, wherein the MCS is adjusted based on a previously determined MCS and an accuracy of a previous suppression of interference is adjusted based on the previously determined MCS;
receiving at least one of an acknowledgement (ACK) indicating that a previous interference suppression performed by the first UE was successful or a negative ACK (NACK) indicating that the previous interference suppression by the first UE was unsuccessful, wherein the interference suppression performed by the first UE is based on the determined MCS;
performing at least one of modulating or encoding data based on the received information indicating the MCS and based on whether the ACK or the NACK is received in response to the previous interference suppression by the first UE, wherein the data is at least one of modulated or encoded based on the determined MCS; and
transmitting the data in the cell transmission to a second UE, wherein the cell transmission is transmitted in at least one of predetermined subframes or subbands.

15. The method of claim 14, wherein the information indicating the received MCS is received from the first UE or from a second cell serving the first UE.

16. The method of claim 14, further comprising:
determining UEs to schedule for receiving a downlink transmission based on the received information indicating the MCS, the determined UEs including the second UE; and
scheduling the second UE to receive the cell transmission based on the determined scheduling.

17. The method of claim 16, wherein the UEs are determined for receiving the downlink transmission based on whether the UEs are able to receive the downlink transmission at the MCS.

18. The method of claim 14, wherein the information indicating the MCS comprises information indicating a channel quality indicator (CQI).

19. The method of claim 14, wherein the data is modulated and encoded with an MCS less than or equal to the indicated MCS.

20. An apparatus for wireless communication, the apparatus being a user equipment (UE), comprising:
means for determining a signal to interference plus noise ratio (SINR) associated with reference signals received from a first cell;
means for determining a modulation order based on the determined SINR;
means for determining, based at least in part on the modulation order, a modulation and coding scheme (MCS) for an interfering first cell transmission that would facilitate interference suppression of the interfering first cell transmission from the first cell when decoding a second cell transmission from a second cell at the UE, the interfering first cell transmission being a transmission unintended for the UE, the second cell transmission being a transmission intended for the UE, wherein the MCS is determined based on a predetermined maximum MCS for the interfering first cell transmission;
means for adjusting the determined MCS based on a previously determined MCS and an accuracy of a previous suppression of interference based on the previously determined MCS;
means for determining at least one of subframes or subbands on which the interfering first cell transmission will be modulated and encoded based on the determined MCS;
means for transmitting at least one of an acknowledgement (ACK) indicating that a previous interference suppression by the UE was successful or a negative ACK (NACK) indicating that the previous interference suppression by the UE was unsuccessful;
wherein the means for transmitting is further configured to transmit, from the UE to the first cell, information indicating the determined MCS;
means for receiving a transmission comprising the second cell transmission from the second cell and the interfering first cell transmission from the first cell, wherein the interfering first cell transmission is modulated and encoded based on the determined MCS;
means for determining whether to suppress interference from the received transmission based on whether the transmission is received in the at least one of the subframes or the subbands;
means for suppressing, from the received transmission, interference to the second cell transmission by the interfering first cell transmission, the interference being suppressed based on the determined MCS; and means for performing at least one of demodulating or decoding the second cell transmission from the received transmission based on the determined MCS.

21. The apparatus of claim 20, wherein the means for performing is configured to demodulate the second cell transmission from the received transmission based on an assumption that the interfering first cell transmission is at least one of modulated or encoded based on the determined MCS.

22. The apparatus of claim 20, wherein the means for performing is configured to decode the second cell transmission from the received transmission based on an assumption that the interfering first cell transmission is at least one of modulated or encoded based on the determined MCS.

23. An apparatus for wireless communication, the apparatus being a cell, comprising:
 means for receiving information indicating a modulation and coding scheme (MCS) for a cell transmission from the cell that would facilitate interference suppression by a first user equipment (UE) of the cell transmission from the cell, wherein the MCS is determined based at least in part on a modulation order and a predetermined maximum MCS, and wherein the modulation order is based on a signal to interference plus noise ratio (SINR) associated with reference signals sent from the cell, wherein the received information indicating the MCS is sent to the cell from the first UE, wherein the MCS is adjusted based on a previously determined MCS and an accuracy of a previous suppression of interference is adjusted based on the previously determined MCS;
 wherein the means for receiving is configured to also receive at least one of an acknowledgement (ACK) indicating that a previous interference suppression performed by the first UE was successful or a negative ACK (NACK) indicating that the previous interference suppression by the first UE was unsuccessful, wherein the interference suppression performed by the first UE is based on the determined MCS;
 means for performing at least one of modulating or encoding data based on the received information indicating the MCS and based on whether the ACK or the NACK is received in response to the previous interference suppression by the first UE, wherein the data is at least one of modulated or encoded based on the determined MCS; and
 means for transmitting the data in the cell transmission to a second UE, wherein the cell transmission is transmitted in at least one of predetermined subframes or subbands.

* * * * *